June 7, 1927.

A. BRAHM 1,631,911

CONNECTING NIPPLE FOR CAST IRON HEATING BOILER ELEMENTS

Filed April 7, 1926

Inventor:
Albert Brahm.

Patented June 7, 1927.

1,631,911

UNITED STATES PATENT OFFICE.

ALBERT BRAHM, OF DUSSELDORF-RATH, GERMANY.

CONNECTING NIPPLE FOR CAST-IRON HEATING-BOILER ELEMENTS.

Application filed April 7, 1926, Serial No. 100,341, and in Germany March 25, 1925.

This invention relates to a connecting nipple for the elements of cast-iron heating boilers, and the object of the invention is to replace the heretofore used connecting nipples consisting of one piece and to prevent thereby a breaking at the connecting bosses as well as cracks or splits formed at other places of the boiler members.

The characteristic features of the improved connecting nipple are constituted by a metallic elastic sleeve and two metallic rings shoved upon said sleeve, and welded to it, said rings being conical and forming a gap between their neighbouring end faces. The conicalness of the rings is such that they fit into the bores of the branches provided at the boiler elements.

Owing to the elasticity of the sleeves they can give way and follow the expansions and contractions of the boiler elements whereby the drawback experienced with the former connecting members are obviated. The expansions and contractions take place particularly quickly when the heating commences and ceases but even in these cases cracks and fractures can be completely prevented by means of the improved connecting nipples.

Figure 1:
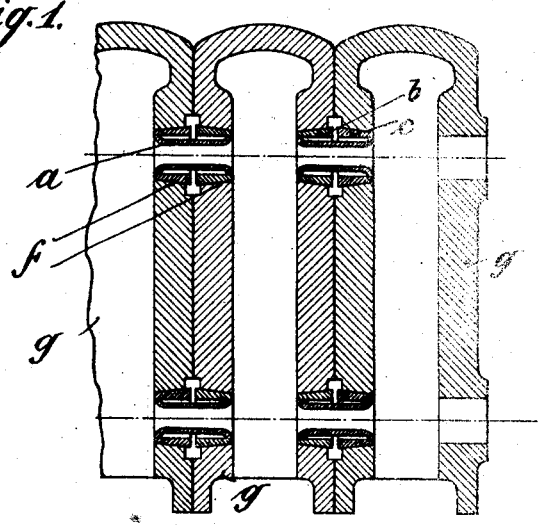
Figure 2:
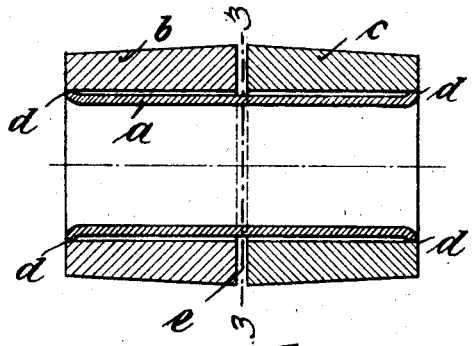
Figure 3:
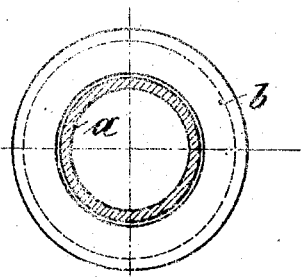
Figure 4:
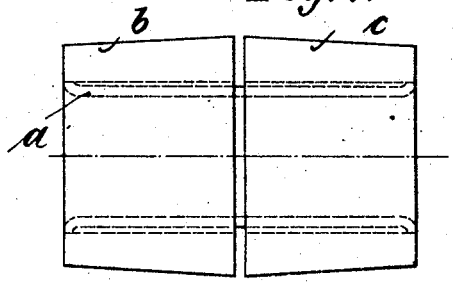

The invention is illustrated diagrammatically and by way of example in the accompanying drawing in which Figure 1 shows a vertical section through a few, heating boiler elements provided with the new connecting nipples; Figure 2 is an axial section through one of these nipples, that is to say, through the sleeve and its appertaining two rings, this figure being drawn to a considerably enlarged scale relatively to Fig. 1; Figure 3 is a cross-section on line 3—3 of Fig. 2, and Figure 4 a view of a complete connecting nipple.

On the drawing, $a$ denotes the elastic sleeve proper which consists, preferably of iron, and $b$ $c$ are two rings forming hollow truncated cones welded together with the sleeve $a$ at the outwardly bent edges $d$ thus forming a hollow space between the sleeve and the rings adapted to give a certain elasticity to the whole of the connecting nipple. The length of the rings $b$ $c$ is such that a gap $e$ remains between their neighbouring end faces. The shape and diameter of the rings $b$ $c$ correspond to that of the bores $f$ of the boiler elements, as shown in Fig. 1.

I claim:

An elastic connecting nipple for cast iron heating elements of boilers comprising in combination a metallic sleeve having its ends outwardly bent, two metallic rings encompassing said sleeve, each ring being firmly connected at its outer end to the respective outwardly bent end of said sleeve, said rings having an internal diameter substantially greater than the external diameter of said sleeve and the combined length of said rings being less than the length of said sleeve, whereby to provide a space between said sleeve and said rings and a gap between the opposed ends of said rings, said rings being exteriorly shaped to fit into connecting bosses of the boiler elements substantially as described and set forth.

In testimony whereof I have hereunto signed my name this 2nd day of March, 1926.

ALBERT BRAHM.